United States Patent [19]
Dudon et al.

[11] Patent Number: 5,933,547
[45] Date of Patent: Aug. 3, 1999

[54] METHOD FOR INTERPOLATING IMAGES

[75] Inventors: Marie Dudon, Issy les Moulineaux; Olivier Avaro, Paris; Gérard Eude, Torcy, all of France

[73] Assignee: France Telecom, Paris, France

[21] Appl. No.: 08/584,354

[22] Filed: Jan. 11, 1996

[30] Foreign Application Priority Data

Jan. 10, 1995 [FR] France .................................. 95 00204

[51] Int. Cl.$^6$ ........................................................ G06K 9/32
[52] U.S. Cl. .......................................... 382/300; 382/236
[58] Field of Search .................................... 382/235, 236, 382/300, 232, 238, 154

[56] References Cited

U.S. PATENT DOCUMENTS

| 5,113,255 | 5/1992 | Nagata et al. | 358/136 |
| 5,307,450 | 4/1994 | Grossman | 395/123 |
| 5,617,482 | 4/1997 | Brusewitz | 382/107 |

FOREIGN PATENT DOCUMENTS

| 0 397 402 | 11/1990 | European Pat. Off. . |
| 0 632 657 | 1/1995 | European Pat. Off. . |
| WO 92/03799 | 3/1992 | WIPO . |

OTHER PUBLICATIONS

ICASSP–94, vol. 5, pp. 205–208, Apr. 19–22, 1994, J. Nieweglowski, et al., "Motion Compensated Video Sequence Interpolation Using Digital Image Warping".

Electronics Letters, vol. 27, No. 20, pp. 1788–1790, Sep. 26, 1991, J.K. Kim, et al., "Fast Frame–to–Frame Interpolation Technique for Scenes Containing Moving Objects".

ICASSP–91, vol. 4, pp. 2713–2716, Apr. 14–17, 1991, G.J. Sullivan, et al., "Motion Compensation for Video Compression Using Control Grid Interpolation".

Visual Communication and Image Processsing '91, vol. 1605, No. 2, pp. 546–557, 1991, Y. Nakaya, et al., "An Iterative Motion Estimation Method Using Triangular Patches for Motion Compensation".

IEEE Transactions on Circuits and Systems for Video Technology, vol. 4, No. 1, pp. 42–51, Feb. 1994, Chung–Lin Huang, et al., "A New Motion Compensation Method for Image Sequence Coding Using Hierarchical Grid Interpolation".

IEEE Transactions on Consumer Electronics, vol. 39, No. 3, pp. 141–150, Aug. 1993, J. Nieweglowski, et al., "A Novel Video Coding Scheme Based on Temporal Prediction Using Digital Image Warping".

IEEE Transaction on Communications, vol. 38, No. 2, pp. 215–222, Feb. 1990, C. Cafforio, et al., "Motion Compensated Image Interpolation".

SPIE–Image Coding, vol. 594, pp. 119–128, Dec. 4–6, 1985, G. Kummerfeldt, et al., "Coding Television Signals at 320 and 64 KBITS/S".

Staftan Ericsson "Motion–Compensated Hybrid Coding at 50KB/s" 1985 IEEE, INRS–Telecommunication, Verdum, Que. H3E1H6, pp. 367–370.

Primary Examiner—Christopher S Kelly
Assistant Examiner—Sheela Chawan
Attorney, Agent, or Firm—Oblon, Spivak, McClelland, Maier & Neustadt, P.C.

[57] ABSTRACT

The invention concerns a method for interpolating images by means of triangulation and geometrical transformation, wherein a triangulation of images and an estimation of movements of apexes is carried out to insert images subsampled temporally or steroscopically.

10 Claims, 4 Drawing Sheets

METHOD FOR INTERPOLATING IMAGES

FIELD OF THE INVENTION

The present invention concerns a method for interpolating images by means of triangulation and geometrical transformation.

BACKGROUND OF THE INVENTION

The technical sphere of the invention concerns interpolating images, whether this insertion is temporal or stereoscopic.

Generally speaking, temporal inter-image interpolation consists of the construction and insertion of additional images by a receiving system. The restored quality of the images depends partly on the quality of the compression or restoring system.

Within the context of system for coding images with digital flow reduction (as for example the one defined by recommendation H.261 of the ITTCC (organization whose new name is UIT.T) for the coding of video at p times 64 kbit/s), a sub-sampling of the images at the coder is one of the means used. The non-transmitted images are then duplicated or interpolated by a decoder which is a simple device to significantly reduce the flow of information required for transmission of the video signal.

Various image interpolation methods using an estimation and movement compensation have been proposed (see refs [1], [2] and [3] given at the end of the description).

An interpolated image may also be used as a prediction image in certain coding methods (this being the case for the standard of the ISO/IEC 11172.2 known as MPEG1):they are then called <<B-frames )), <<P-frames >>).

The temporal interpolation of images is also useful in medical applications in which it may be desired to have a patient exposed as little as possible to the image-taking device (X-rays, for example) by reducing the number of views, that is images.

Another application is the interpolation of images in cases of stereoscopy. This then concerns interpolated stereoscopic images.

The image interpolation methods are reduced in a large number of practical implementations to a single recopy from the preceding image (rereading of a memory) or to a linear insertion.

Studies based on movement estimation have been proposed by several authors (see refs [1] and [3]. Often, the calculation of the movement vectors is effected on blocks of rectangular (or square) sizes N×M.

The triangulation of images has in particular been proposed so as to improve image prediction in the case of inter-image diagrams with estimation/movement compensation (see refs [4] and [5]).

The notion of bi-directional image is not traditionally used with a triangle-based movement estimation, but only with a base of blocks.

In a conventional temporal interpolation method, the sequences obtained by a single recopy of the preceding image do have the drawback of being intermittent. The use of a single linear interpolation moreover produces a shadow or out-of-focus effect which prove to be totally undesirable.

In more elaborate methods, it is essential to identify several zones, such as the bottom or moving objects or to calculate segmentation masks. But the interpolations using the movement vectors obtained on blocks with a size M×N do not make it possible to form a continuous interpolated image derived from a dense vector field.

Known methods, which seek to obtain fields with denser and more continuous vectors, require the calculation of the vectors towards the front (future of the image (n−k) towards the image (n)) and towards the rear (moved from the image (n) towards the image (n−k)) so as to identify occlusion zones (see ref [1]). Existing methods do not make it possible to easily in a single passage obtain a field of vectors for the image to be interpolated which covers the image continuously.

One of the most important problems to resolve for interpolation via movement compensation is the determination of a movement vector for each point of the image to be inserted. Phenomena, such as occlusions, zoom effects, ambiguities concerning the nature of the point (bottom or moving object) produce gaps in the plane of the interpolated image and which need to be filled up, and ambiguities which need to be resolved so as to avoid artifacts in the interpolated image.

A document with the ref [7] at the end of the description describes an image interpolation method in which all the image elements are restored at a moment of their trajectory by using a mesh cutting the image into blocks having the shape of non-overlapping trapeziums. The movement of nodes of this mesh determines the desired deformations of the image blocks. The movements of these nodes are estimated. It is possible to carry out a refined logging by dividing each trapezium into two triangles.

So as to resolve existing problems in the devices of the prior art, the invention concerns a method able to produce interpolated images by using fields with dense continuous vectors. The invention also is concerned with minimizing the amount of information to be transmitted.

SUMMARY OF THE INVENTION

The invention concerns an image interpolation method which uses a triangulation of images and an estimation of the movement of apexes of triangulation so as to insert images sub-sampled temporally or stereoscopically, wherein:

the stage for detecting apexes of triangulation is effected automatically according to the contents of the stored images;

the triangulation stage is carried out once all the apexes are detected;

the search for the point in the current image which corresponds to the apex furnishes a movement vector for the apex in question;

all the movement vectors, by weighting of the vectors and images, makes it possible to produce interpolated images.

The number of apexes is preferably fixed at the start of the sequence or estimated during treatment of the sequence by means of an analysis of the dynamic activity of the images, this number being variable allowing for control of the number of movement vectors used to represent the full vector field.

The stage for calculating the apexes (or nodes) of the triangles is preferably carried out automatically.

One of the main original features of the method of the invention resides in the fact that the apexes are calculated by the system itself without any additional transmission of information.

The apexes are preferably placed automatically at the characteristic image points defined by a large spatial gradient and/or a large temporal gradient.

Partitioning of the image is preferably effected by means of an automatic triangulation of the detected apexes.

The spatial and temporal gradients may be determined from the stored images.

Automatic triangulation may be effected with a one-to-one correspondence if the images in question are identical.

Advantageously, the movement at any point of a given triangle corresponds to a refined transformation fully defined by the movement of the three apexes of the triangle.

The interpolation process inserted in a full coding diagram may be followed by an information coding concerning the interpolation error so as to improve the quality of the interpolated images at the decoder.

The interpolation error coding is preferably effected by a conventional coding method.

The method of the invention can be advantageously improved by the transmission of additional information so as to increased interpolation quality. In this case, the invention may form an integral part of a coding system using bi-directional prediction modes.

In one advantageous embodiment, the method of the invention successively includes the following stages:

storing of the images n and n–p;

full triangulation of a reference image making it possible to embody a triangulation from a set of selected points in the image according to certain predetermined characteristics;

estimation of the movement and deformations of these triangles for the image n–k+p with 0<p<k situated between the image n and the image p making it possible to obtain estimations of the displacement vectors of the apexes between the image n–k and the image n–k+p;

calculation of the vectors for each point of the triangles of the image n–k+p to be interpolated;

calculation of the points of the image n–k+p according to their estimated vectors.

In the triangulation stage, an automatic meshing is preferably used. The reference image is the image n or the image n–k. The image n–k is subjected to a high pass filtering. The selected points are large gradient points or large temporal difference points.

In the vector calculation state, the value of the components of the displacement vector at the point in question is calculated as follows:

$$u)x,y)=x'-x=(a-1)x+by+e \equiv a_{i'+a_2}x+a_3y$$

$$v(x,y)=y'-y=cx+(d-1)y+f \equiv a_4+a_5x+a_6y$$

These six components $a_1$ are calculated according to the displacements at the apexes of the image n–k+p of the triangle encompassing the point considered.

In another embodiment, the method of the invention may be integrated with a reduced flow coding system or be rendered more efficient in a restoration system by coding the interpolation error.

The triangulation method is then applied to particular points which is determined unambiguously once the images in question are identical.

Thus, all the five preceding stages may be effected by a decoder with the transmission or use of additional data to calculate the predicted interpolated image.

A conventional coding is then carried out to the error signal between the real image and its prediction (interpolated image). Thus, it is possible to use a triangulation interpolation in any coder.

Therefore, added to the five preceding stages for any image (n–k+p) with 0<p<K are:

On coding (or more generally with any direct treatment system):

in a sixth stage, the calculation of the error signal which is made up of a difference (possibly thresholded) between the image to be transmitted (n–k+p) and the interpolated image (n–k+p) derived from the calculation, in a seventh stage, coding by a conventional prediction error image method.

On decoding (or more generally with any reciprocal treatment system), the sixth stage is the same and the seventh stage becomes:

the prediction error is decoded and added to the prediction error image calculated in the sixth stage.

The invention used as part of a compression system is able to use the interpolated image as a prediction so that additional data can be transmitted with the aide of a conventional method (for example, a coding by transformation of the error signal between the real image and its interpolated prediction with the method of the invention).

The method of the invention does not need to transmit the characteristic points (apexes of triangles and vectors) used.

This same method of the invention can be used for calculating intermediate images in the case of stereoscopic images.

The rendition of animated sequences in which images have been omitted has been clearly improved. For example, a use of the image interpolation method on sequences coded with H.261 at 10 Hz shows a clearly visible significant gain in terms of SNR. The stereoscopic rendition, for which the number of views has been limited, is significantly improved.

DETAILED DESCRIPTION OF THE PREFERRED EMBODIMENTS

Figure 1:
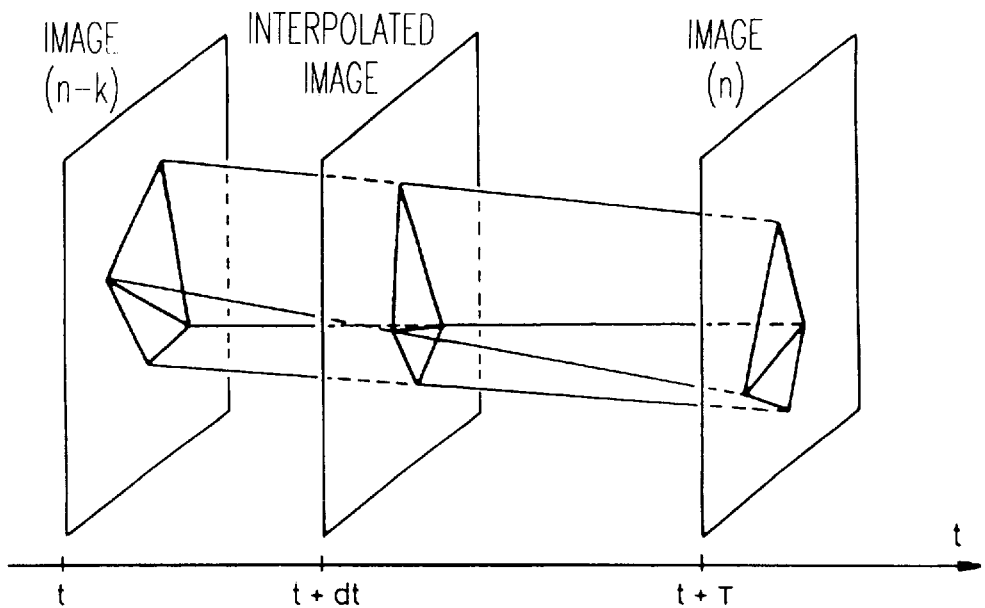
FIG. 1 illustrates the representation of an image.

As shown on FIG. 1, an image is represented by a set of adjacent triangles. The reference sites in question are the apexes of each triangle so that the transformed image obtained is continuous.

The images (n) and (n–k) between which the images are to be interpolated are stored so that the calculations required to implement the method can be made. The number of images able to be interpolated varies and depends on the value of k.

The images (n) and (n–k) may consist of the images of a given scene at different times (n) and (n–k) (case of temporal interpolation) or of images representing a given scene at a given instant under angles with a different view (case of stereoscopic interpolation).

Several know triangulation techniques have already been proposed for prediction applications in image coding, but the originality of the present method derives from the fact that the technique is used for an interpolation and that the transmission of the triangle apexes may be omitted.

Figure 2:
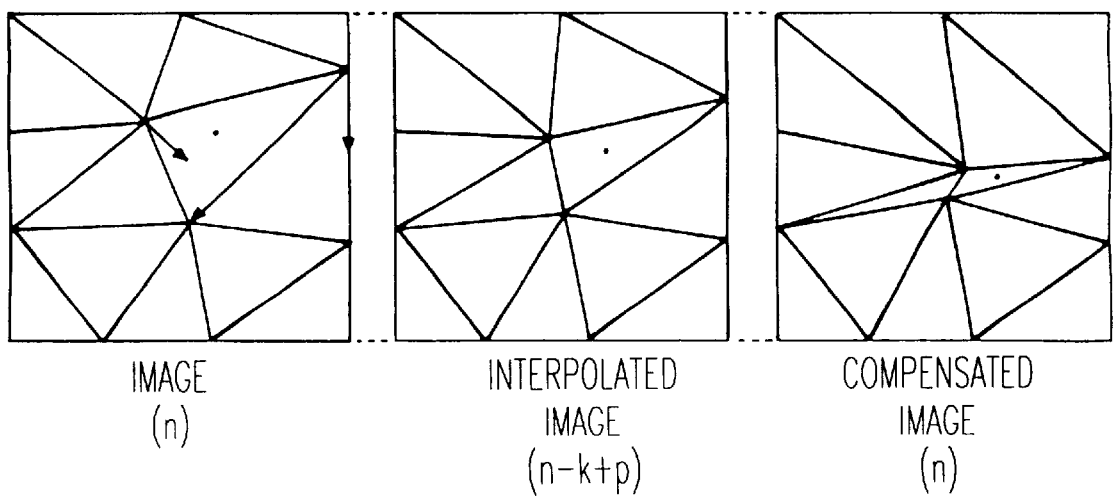
FIG. 2 illustrates an inter-image interpolation by movement compensation based on a triangular decomposition of an image.

FIG. 2 shows an inter-image interpolation by movement compensation based on a triangular decomposition of an image.

Pure interpolation mode

Figure 3:
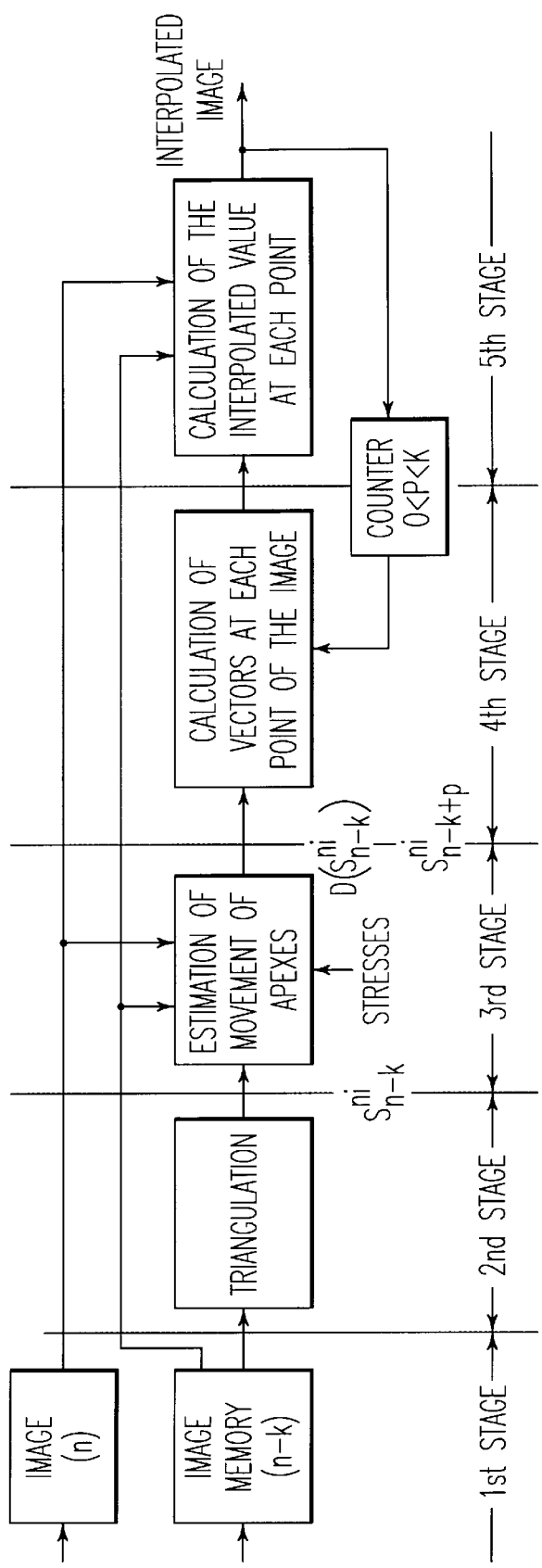
FIG. 3 shows the functioning of one embodiment of the invention.

This first embodiment of the invention shown on FIG. 3 includes the succession of the following stages:

A first stage consists of storing the images (n) and (n−k). These images (n) and (n−k) are those known by the restoring system. In the case of a decoder, this concerns images restored from information transmitted by a coder. The number of images possible to interpolate corresponds to the value (k−1).

A second stage consists of the full triangulation of the reference image, which, in this mode, may be the image (n) or the image (n−k), depending on the selected use.

In this triangulation stage, an automatic meshing is used as part of the method. It consists of carrying out a triangulation from a set of selected points in the image according to certain predetermined characteristics. In particular, it is possible to choose points with a large gradient, such as large temporal difference points. The apexes are selected from these points so that they are distributed inside the entire image.

A meshing example may be as follows : the image (n−k) is subjected to a high pass filtering. The gradient image obtained, which may be thresholded, supplies all the points from which the apexes are to be selected. For example, this selection is made by defining a minimum gap between each apex, this gap taking account of the total number of apexes, dimensions of the image and the number gradient points obtained. Another simple selection method consists of only retaining the largest NbMaw gradient points. A gradient masking example used for high pass filtering is then:

$$\begin{pmatrix} 0 & -1 & 0 \\ -1 & 4 & -1 \\ 0 & -1 & 0 \end{pmatrix}$$

The number of NbMax apexes is a parameter which may vary according to the sought-after precision and the complexity permitted. The parameters derived from this second stage are the coordinates of the apexes (or nodes) $S_{n-k}^{ni}$ of the triangles.

A third stage is the estimation of movement and deformations of these triangles for the image (n−k+p) with 0<p<k situated between the image (n) and the image (n−k). The images for all the values p between 1 and (k−1) may be interpolated with a predetermined order which depends on the counter. Known methods, such as the one described in reference (4), may be used to estimate these vectors. The method of the invention may be implemented by using information concerning the apexes of the triangles and the movement vectors which are derived from parameters transmitted by a triangle-based coding system of the type proposed in references (3) and (4). the parameters derived from this third stage are the estimations of movement vectors of apexes between the image (n−k) and the image (n−k+p) noted $D(S_{(n-k),(n-k+p)}^{n})$.

The coordinates of the moved apexes $S_{(n-k+p)}^{n}$ are calculated from these vectors.

Figure 4:
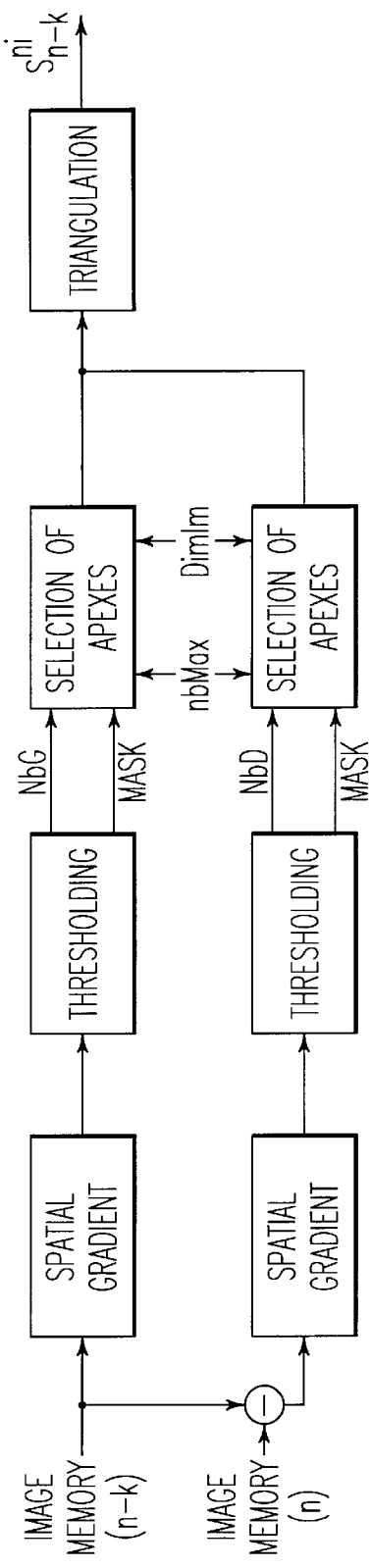
FIG. 4 shows the stage for determining the apexes and triangulation.

The description of the determination of the apexes is illustrated on FIG. 4 shown:

NbG=number of gradient points;

NbD=number of difference points;

Dimim=image dimensions;

NbMax=total number of apexes.

Triangulation may be the one defined by Delaunay in reference (6).

A fourth stage consists of calculating the vectors for each point of the triangles of the image (n−k+p) to be interpolated, that is of estimating the deformations, the evolution of each triangle is represented by a refined transformation. This type of transformation allows a large number of transformations to be represented, such as rotations, zooms, translations, for each point (x,y) of the region in question, the corresponding transformed position (x',y') is given by the following equation:

$$\begin{pmatrix} x' \\ y' \end{pmatrix} = \begin{pmatrix} a & b \\ c & d \end{pmatrix}\begin{pmatrix} x \\ y \end{pmatrix} + \begin{pmatrix} e \\ f \end{pmatrix}$$

where the coefficients a,b,c,d,e and f are determined for each triangle.

The value of the components of the displacement vector at the point in question is calculated as follows:

$$\begin{cases} u(x,y) = x' - x = (a-1)x - by - e \equiv a_1 - a_2 x - a_3 x \\ v(x,y) = y' - y = cx - (d-1)y - f \equiv a_4 - a_5 x - a_6 y \end{cases}$$

or again in matrix form:

$$\begin{pmatrix} u \\ v \end{pmatrix} \begin{pmatrix} 1 & x & y & 0 & 0 & 0 \\ 0 & 0 & 0 & 1 & x & y \end{pmatrix} \begin{pmatrix} a_1 \\ a_6 \end{pmatrix}$$

Figure 5:
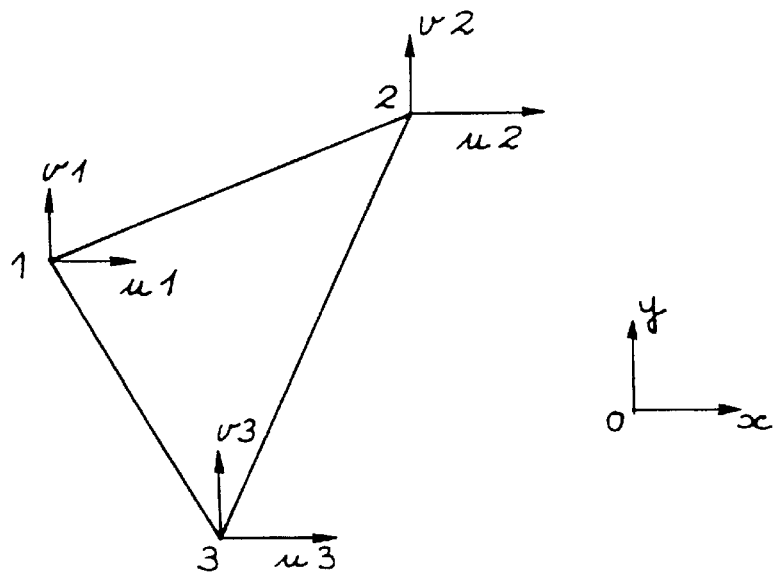
FIG. 5 shows the displacement of the apexes of a triangle encompassing a particular point.

As shown on FIG. 5, the six components a are calculated according to the movements at the apexes (or nodes) $S_{n-k+p}^{ni}$ the triangle encompassing the relevant point:

$$\begin{pmatrix} 1 & x_1 & y_1 & 0 & 0 & 0 \\ 1 & x_2 & y_2 & 0 & 0 & 0 \\ 1 & x_3 & y_3 & 0 & 0 & 0 \\ 0 & 0 & 0 & 1 & x_1 & y_1 \\ 0 & 0 & 0 & 1 & x_2 & y_2 \\ 0 & 0 & 0 & 1 & x_3 & y_3 \end{pmatrix} \begin{pmatrix} a_1 \\ a_2 \\ a_3 \\ a_4 \\ a_5 \\ a_6 \end{pmatrix} = \begin{bmatrix} [\phi] & 0 \\ 0 & [\phi] \end{bmatrix}$$

Sop as to determine the coefficients $a_j$ according to the nodal motions, the reciprocal value of the matrix $\Phi$ is calculated:

$$[\phi] = \frac{1}{\det(\phi)} \begin{pmatrix} x_2 y_3 - x_3 y_2 & x_3 y_1 - x_1 y_3 & x_1 y_2 - x_2 y_1 \\ y_2 - y_3 & y_3 - y_1 & y_1 - y_2 \\ x_3 - x_2 & x_1 - x_3 & x_2 - x_1 \end{pmatrix} \equiv$$

$$\frac{1}{\det \phi} \begin{pmatrix} a_1 & a_2 & a_3 \\ \beta_1 & \beta_2 & \beta_3 \\ \gamma_1 & \gamma_2 & \gamma_3 \end{pmatrix}$$

with:

$$\det(\Phi) = x_2 y_2 - x_3 y_2 - x_3 y_1 - x_1 y_3 - x_1 y_2 - x_2 - x_2 y_1$$

The matrix is reversible if the determinant differs from zero, that is if the area of the triangle is not nil and thus if the triangle has not degenerated. The motion vector at any point $p = (x, y)^r$ is obtained with the following calculation:

$$D(p) = D(x, y) = \begin{pmatrix} u(x, y) \\ v(x, y) \end{pmatrix} = \begin{pmatrix} 1 & x & y & 0 & 0 & 0 \\ 0 & 0 & 0 & 1 & x & y \end{pmatrix} \begin{pmatrix} a_1 \\ a_6 \end{pmatrix}$$

with:

$$\begin{pmatrix} a_1 \\ \vdots \\ a_6 \end{pmatrix} = \begin{bmatrix} (\phi)^{-1} & 0 \\ 0 & (\phi)^{-1} \end{bmatrix} \begin{pmatrix} u_1 \\ \vdots \\ v_3 \end{pmatrix}$$

Figure 6A:
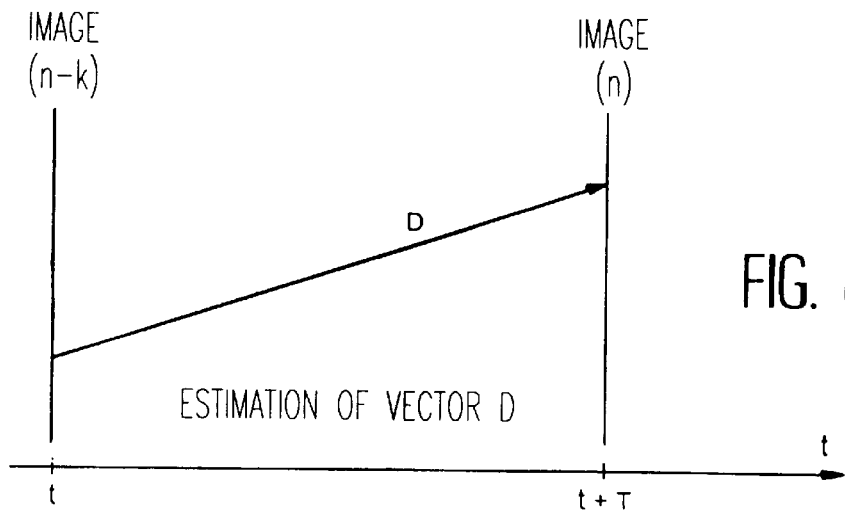
FIGS. 6A, 6B and 6C illustrate the calculation of the points of the image according to their estimated vectors.
Figure 6B:
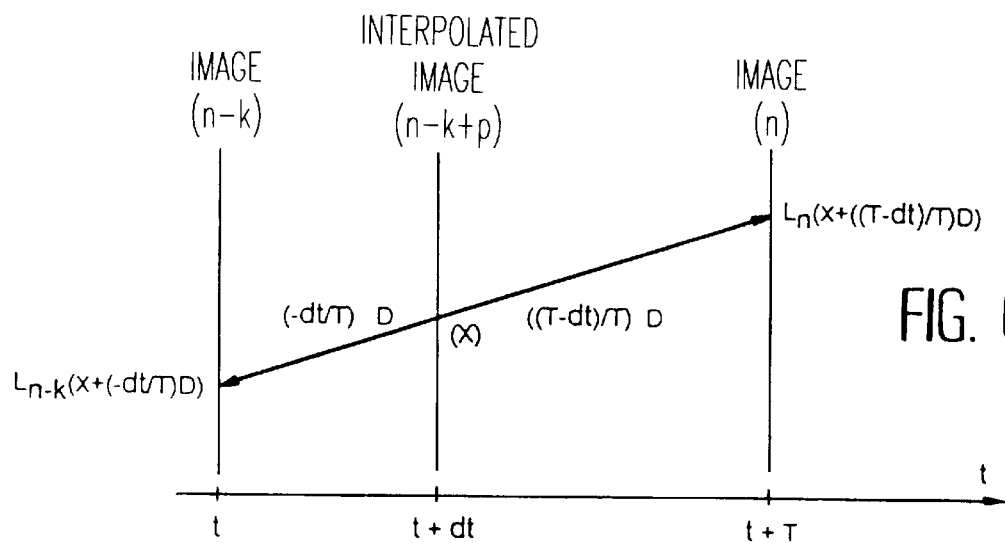
Figure 6C:
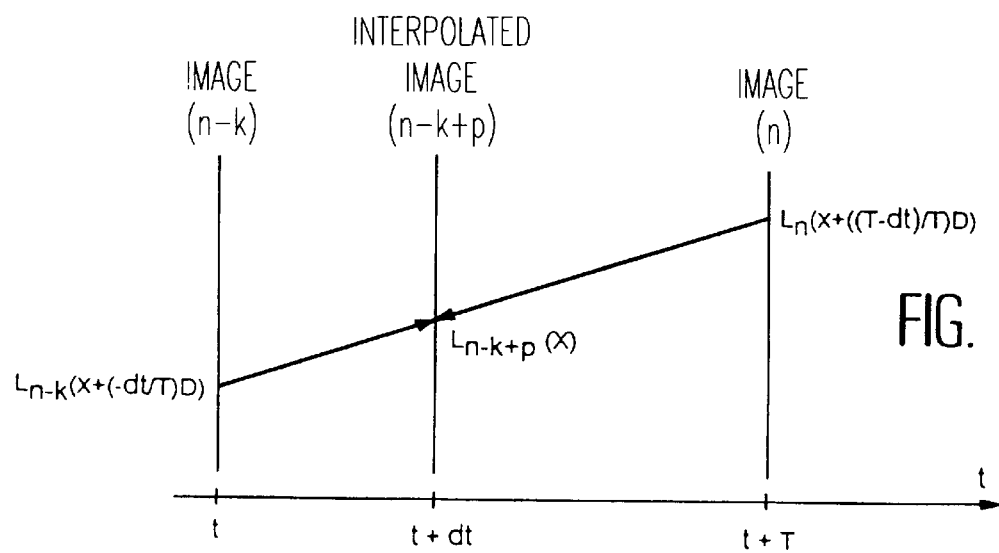

A fifth stage consists of calculating the points of the image (n−k+p) according to their estimated vectors. In the method of the invention, the image is represented by a set of adjacent triangles, as shown on FIGS. 6A, 6B and 6C.

$L_m(k)$ corresponds to the value of the image m at the point k. This value L may in particular be the luminance or any other sought-after characteristic of the image.

The proposed algorithm uses a continuous field of vectors because of the considered model. If the structural and movement information is considered, the value $L_{n-k+p}$, for example luminance, of the image to be interpolated is calculated for each triangle as follows:

$$L_{n-k-p}(x) = \left(\frac{T-dt}{T}\right) L_{n-k}\left(x - \frac{dt}{T} D\right) + \frac{dt}{T} L_n\left(x - \left(\frac{T-dt}{T}\right) D\right)$$

$$D(p) = D(x, y) = \begin{pmatrix} u(x, y) \\ v(x, y) \end{pmatrix} = \begin{pmatrix} 1 & x & y & 0 & 0 & 0 \\ 0 & 0 & 0 & 1 & x & y \end{pmatrix} \begin{pmatrix} a_1 \\ a_6 \end{pmatrix}$$

with:

$$\begin{pmatrix} a_1 \\ a_6 \end{pmatrix} = \begin{pmatrix} (\phi)^{-1} & 0 \\ 0 & (\phi)^{-1} \end{pmatrix} \begin{pmatrix} u_1 \\ \vdots \\ v_3 \end{pmatrix}$$

The change of the value (p) makes it possible to calculate a new interpolated image by taking up the calculations from the fourth stage.

Figure 7:
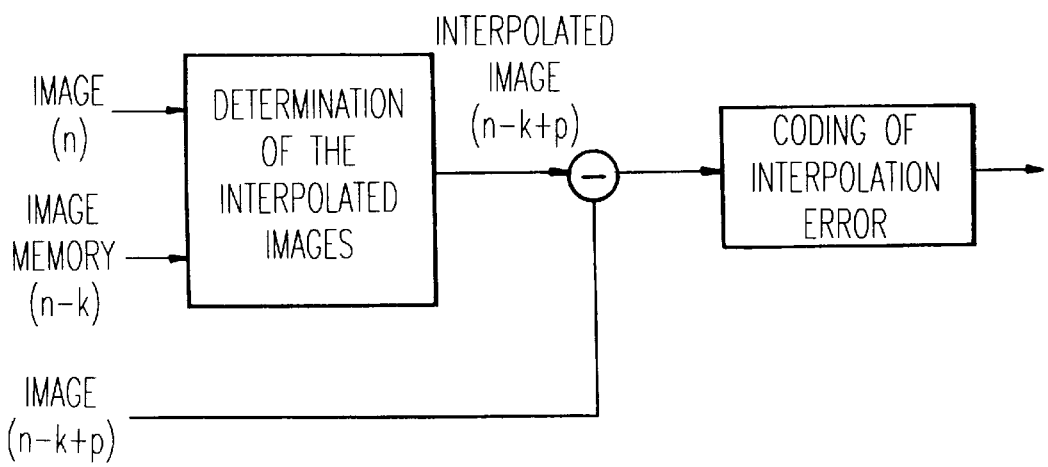
FIG. 7 generally illustrates this embodiment of the invention.

The mode of the invention defined above is generally shown on FIG. 7.

Bi-directional images type integrated and increased interpolation mode

In a second embodiment, the method of the invention can also be integrated with a flow reduction coding system or be rendered more efficient in a restoration system by coding the interpolation error.

The triangulation method is applied to particular points for which determination is effected unambiguously once the images in question are identical: for example, this concerns the choice of the largest NbMax gradient points with a predefined calculation mask.

Thus, all of the five stages described above may be carried out by the decoder without transmitting or using additional data to calculate the predicted interpolated image.

A conventional coding is then made to the error signal between the real image and its prediction (interpolated image). This method is able to use a triangulation interpolation in any coding.

Added to the stages of the previous paragraph for any image (n−k+p) with 0<p<k are:

On coding (or more generally with any direct treatment system):
in a sixth stage, the error signal is calculated which is constituted by a difference (possibly thresholded) between the image to be transmitted (n−k+p) and the interpolated image (n−k+p) derived from the calculation of the fifth stage,
in a seventh stage, coding is carried out by a conventional prediction error image method.

On decoding (or more generally with any other reciprocal treatment system), the sixth stage remains the same and the seventh stage becomes:
the prediction error is decoded and added to the prediction error image calculated in the sixth stage.

REFERENCES (1) J. Ribas-Corbera, J. Skianski: <<(Interframe interpolation of cinematic sequences >>, JVCIR, Vol. 4, No. 4, December 1993, page 392.

(2) C. Cafforio, F. Rocca, S. Tubaro: <<Motion compensation image interpolation >>), IEEE Transaction on Communications, Vol. 38, No. 2, February 1990.

(3) R. Thoma, M. Bierling : <<(Motion compensating interpolation considering covered and uncovered background>>, Signal Processing: Image comm., Vol. 1, No 2, October 1989.

(4) J. J. Jacq., C. Roux: <<2D and 3D medical optical image formation automatic monomodality retiming with the id of a conventional genetic algorithm>>9th congress for the recognition of shapes and artificial intelligence, AFCET/AFIA, Pairs, January 1994.

(3) H. Brusewitz: <<Motion estimation with triangles>>Proc 3rd Int. Conference on 64 kbps coding of moving video, free session, Rotterdam, Holland, September 1990.

(4) H. Brusewitz: <<Method of motion compensation and elastic deformation in picture sequences >>, PCT patent application, number WO 92/03799 filed on Aug. 12, 1991.

(5) Y. Nakaya, H. K. Harashima: <<An iterative motion estimation method using triangular patches for motion estimation), SPEE Symp. on Visual Comm. and image Proc., 1991.

(6) Y. Correc, E. Chapuis: <<Fast computation of Delaunay triangulations>>, Adv. Eng. Software, 1987.

(7) J. Nieweglowski and al.: <<Motion Compensated Video Sequence Interpolation Using Digital Image Warping>>, ICASSP'94, IEEE International Conference On Acoustics, Speech and Signal Processing, vol. 5, 19–22 April 1994, pages 205–208.

What is claimed is:

1. Image interpolation method using a triangulation of images and an estimation of movement of apexes of triangulation so as to temporarily or stereoscopically embody an interpolation of sub-sampled images, comprising:

detecting apexes of triangulation in stored images automatically based on contents of the stored images;

partitioning the stored images by triangulating the stored images based on the apexes of triangulation detected in said detecting step;

calculating movement vectors for the apexes of triangulation;

determining coordinates of apex points in an interpolation image from the movement vectors, said apex points corresponding to the detected apexes of triangulation;

determining coordinates of other points other than the apex points in an interpolation image by weighting the movement vectors; and producing the interpolated image based on the determined apex points and other points.

2. Method according to claim 1, further comprising:

analyzing a dynamic activity of the stored images; and estimating a number of apexes of triangulation from said analyzing step thereby controlling a number of movement vectors used to represent a full vector field.

3. Method according to claims 1 or 2, wherein the detecting the apexes of triangulation is free from transmitting information.

4. Method according to claims 1 or 2, wherein detecting apexes comprises automatically placing the apexes of triangulation at characteristic image points defined by at least one of a large spatial gradient and a large temporal gradient.

5. Method according to claim 1, wherein producing the interpolated images comprises:

applying a refined transformation to any point of a given triangle, wherein said refined transformation is fully defined by the movement vectors of the three apexes of the triangle.

6. Method according to claim 4, wherein the detecting of apexes of triangulation comprises determining temporal and spatial gradients determined from the stored images.

7. Method according to claim 5, wherein the automatic triangulation is effected with a one-to-one correspondence between the stored images if the stored images are identical.

8. Method according to claims 1 or 2, wherein the partitioning of the image comprises automatic triangulation of the detected apexes of triangulation.

9. Method according to claim 1, further comprising:

determining an error signal based on a difference between an image to be transmitted and the interpolated image;

coding the error signal to derive a prediction error; and transmitting the prediction error in association with the interpolation image to a decoder.

10. Method according to claim 1, further comprising:

fixing a number of apexes of triangulation at a start of said method thereby controlling a number of movement vectors used to represent a full vector field.

* * * * *